Dec. 2, 1969 S. RAETHER 3,481,798
PROCESS FOR THE PREPARATION OF AN ALUMINUM SUPPORT
FOR PRESENSITIZED PLANOGRAPHIC PRINTING PLATES
Filed March 21, 1966
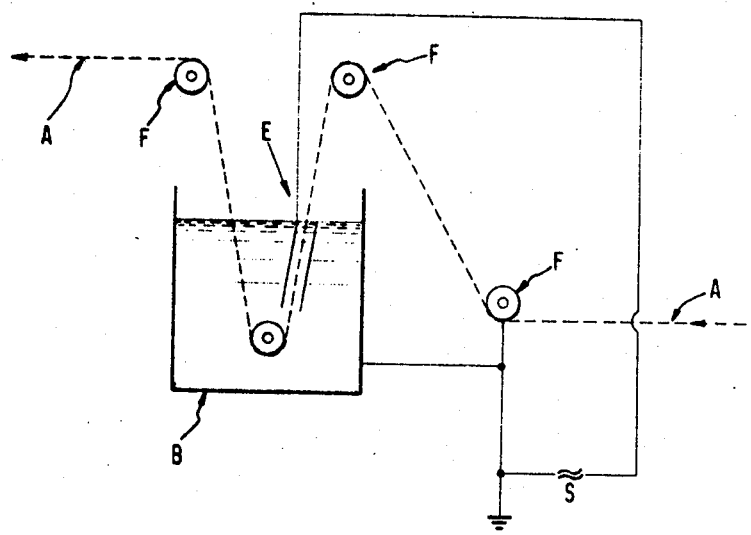
INVENTOR
SIEGFRIED RAETHER
BY *James E. Bryan*
ATTORNEY

United States Patent Office 3,481,798
Patented Dec. 2, 1969

3,481,798
PROCESS FOR THE PREPARATION OF AN ALUMINUM SUPPORT FOR PRESENSITIZED PLANOGRAPHIC PRINTING PLATES
Siegfried Raether, Idstein, Taunus, Germany, assignor to Kalle Aktiengesellschaft, Wiesbaden-Biebrich, Germany
Filed Mar. 21, 1966, Ser. No. 535,927
Claims priority, application Germany, Mar. 23, 1965, K 55,620
Int. Cl. C23f 7/00
U.S. Cl. 148—6.27                    4 Claims

ABSTRACT OF THE DISCLOSURE

This invention relates to a process for the preparation of an improved böhmite coating on aluminum which comprises treating the aluminum with an aqueous solution of at least one corrosion inhibitor, at an effective elevated temperature.

---

U.S. Patent No. 3,210,184 relates to presensitized planographic printing plates comprising an aluminum support and a reproduction coating thereon, in which, between the reproduction coating and the aluminum support, there is a böhmite coating produced by the action of water or aqueous-alkaline solutions at elevated temperatures.

Now it has been found that certain imperfections in the coating, which result during the production of the böhmite coating on the aluminum support, are avoided and an improved aluminum support with a böhmite coating for the presensitized printing plates according to the above patent is obtained by a process constituting the subject matter of this invention. In the process of the invention, the production of the böhmite coating is effected by the action of water at elevated temperature with the addition of corrosion inhibitors to the hot water or with the application of low direct current voltages or alternating current voltages to the treatment bath.

In the known production of böhmite by reaction between aluminum and water or steam, particularly at temperatures between 70 and 100° C., at the beginning of the reaction the aluminum hydroxide layer which is formed in the atmosphere and which is always present on aluminum is first converted into böhmite by absorption of water. The actual reaction between the water and the aluminum, with the evolution of hydrogen, then follows. This evolution of gas is important for the formation of a coarse structure in the böhmite, a structure which permits the penetration of water through the coating to the metal surface, also in the case of increasing thickness of coating.

The formation of a coarse structure in the böhmite also depends on the reaction time. The more rapidly the reaction begins and proceeds, the coarser is the macrostructure of the böhmite formed, and the less soiled the surface of the aluminum or aluminum hydroxide exterior layer, the more rapidly does the action of the water begin. The formation of a uniform böhmite coating on aluminum surfaces soiled in places (for example, the surfaces of strips of aluminum are always soiled) is therefore not possible. Also, after the use of additional cleaning processes, for example after rolling, non-uniform formation of böhmite frequently results since the cleaned aluminum surfaces are extraordinarily sensitive and readily adsorb greases and oils, also from the gas phase. Trouble of this kind during the formation of the böhmite often can be discerned as grey streaks or spots on the surface of the aluminum.

In order to avoid these defects, generally alkaline-reacting chemicals have been added to the water. However, these additives not only facilitate the elimination of the impurities during the formation of the böhmite, but also have a detrimental effect on the coarse structure of the metal surface and of the böhmite layer and are not to be used in all cases. With increasing pH-value, the cleaning effect increases but the corrosion of the aluminum also becomes greater. The corroding additives are therefore consumed during the formation of the böhmite. They must be continuously replenished and the corrosion products removed from the reaction solution.

This invention provides two possibilities for improving the böhmite coating and for increasing the uniformity thereof. Either the unsoiled areas of the aluminum surface are blocked by protective coatings, in order to delay the commencement of the reaction in such areas and to approximate it to the commencement of the reaction in the other areas of the surface (the soiled areas) or, alternatively, the reaction-delaying influence of the impurities is overcome or reduced by electrical means.

To protect the bare (unsoiled) areas of the surface, small amounts of corrosion inhibitors are added to the water used for the formation of the böhmite, which inhibitors are absorbed at the metal surfaces and retard the processes of corrosion. A large number of substances exhibiting this action are known today. It is important that the reaction between the aluminum and the water be delayed for only a relatively short time, in general one minute at the most, in order to make the reaction in the areas of the aluminum surface in which there are varying amounts of impurities begin substantially uniformly.

A suitable corrosion inhibitor for the process of the invention can be determined in the following manner:

(a) Its solutions in water in amounts of under 1 percent by weight change the pH-value only slightly, (b) No substantial consumption by the böhmite reaction, (c) No formation of spots after the formation of the coating, and the (d) Thickness of the böhmite coating is not substantially dependent upon the additives, but only on the temperature and the duration of the treatment.

If, for example, the thickness of the böhmite coating is investigated after the same treatment times of about 1 minute in solutions with a small addition of (1) silicate, or
(2) alizarin, or
(3) dicyclohexylammonium nitrite, the formation of böhmite in solution 1 is almost completely prevented, in solution 3 no substantial influence on the reaction can be observed, while by the addition of alizarin (solution 2) a coating thickness is achieved which is intermediate that of the other test specimens.

When the use of corrosion inhibitors is not suitable, or appears to be impracticable, a uniform commencement of reaction is effected by small electric currents during the formation of the böhmite. The current density in the case of voltages which technologically are not difficult to achieve has a top limit set by the low electrical conductivity of the distilled water and is therefore distinctly different in magnitude from the current densities which occur in the known anodizing processes. As measurements show, it is possible and, in part, desirable, to influence the size of the pores of the coating by small electric currents during the formation of the böhmite, but the thickness of the coating is definitely determined by the chemical reaction, in contrast to the formation of the known anodized coatings.

The invention will be further illustrated by reference to the following specific examples:

EXAMPLE 1

A solution of 0.3 percent by weight of dicyclohexylammonium nitrite in distilled water is heated to 95–98° C. A smooth rolled aluminum sheet which was previously degreased by washing it with gasoline is immersed in this hot solution. After about 20 seconds the evolution of gas commences uniformly over the entire surface. The thickness of the böhmite coating can, up to a limit of 10 to 15 minutes, be regulated by the treatment time. After the treatment, irregular gray spots on the surface of the aluminum sheet can not be discerned.

EXAMPLE 2

A mechanically de-greased aluminum strip was passed through a 0.2 percent by weight solution of dicyclohexylammonium nitrite in distilled water at 95° C. When the moving strip remained in the treatment bath for about 60 seconds, there was formed over an appreciable length of the strip of böhmite layer which was approximately 1000–2000 A. thick and was free of spots.

EXAMPLE 3

A mechanically de-greased alumium strip was passed through distilled water at 95 to 98° C. In the bath, two electrodes were arranged at a distance of 1 to 2 cm. from the strip. When a DC voltage of 6 volts was applied, after a short time a current density of approximately 0.1 ma./cm.$^2$ was produced, which sufficed for the formation of a böhmite layer free from defects. The strip may be arranged as anode or cathode with equally good results.

In the attached drawing, the operating arrangement is shown schematically. A is the aluminum strip on which the böhmite layer is produced, B is the water container through which the aluminum strip is drawn via the guide rollers F. E is the electrode, and S is the current source. The aluminum strip and the container are grounded.

EXAMPLE 4

The same procedure was followed as in Example 3, but instead of a direct-current voltage, an alternating-current voltage was used. With 5 volts, a current density of about 0.5 ma./cm.$^2$ was measured. The appearance of the böhmite coating was satisfactory.

EXAMPLE 5

Aluminum foils of 15μ thickness were treated in double-distilled water of 95 to 98° C. with and without the application of alternating-current voltage (0.3 ma./cm.$^2$), and the structure of the böhmite layers which were formed was investigated by the BET method. In the case of the böhmite coatings produced without the application of an alternating-current voltage, pores with diameters of greatly varying size are present, but with the flow of current the frequency of pores of larger diameter is reduced, and that of pores of smaller diameter, especially those of 20 A., is increased.

It will be obvious to those skilled in the art that many modifications may be made within the scope of the present invention without departing from the spirit thereof, and the invention includes all such modifications.

What is claimed is:

1. A process for the preparation of an improved böhmite coating on aluminum which comprises immersing the aluminum in an aqueous solution of dicyclohexylammonium nitrite, at a temperature in the range of about 70 to 100° C.

2. A process according to claim 1 in which the aqueous solution contains about 0.2 to 0.3 percent by weight of dicyclohexylammonium nitrite.

3. An improved böhmite coating on aluminum produced by immersing the aluminum in an aqueous solution of dicyclohexylammonium nitrite at a temperature in the range of about 70 to 100° C.

4. An improved böhmite coating according to claim 3 in which the aqueous solution contains about 0.2 to 0.3 percent by weight of dicyclohexylammonium nitrite.

References Cited

UNITED STATES PATENTS

| 1,551,613 | 9/1925 | Pacz | 148—6.27 |
| 3,380,860 | 4/1968 | Lipinski | 148—6.27 |

RALPH S. KENDALL, Primary Examiner

U.S. Cl. X.R.

204—58